(12) United States Patent
Freilich

(10) Patent No.: US 9,138,811 B2
(45) Date of Patent: Sep. 22, 2015

(54) METHOD AND APPARATUS FOR LATHE TOOL ALIGNMENT

(76) Inventor: Daniel S. Freilich, Castaic, CA (US)

( * ) Notice: Subject to any disclaimer, the term of this patent is extended or adjusted under 35 U.S.C. 154(b) by 174 days.

(21) Appl. No.: 13/562,075

(22) Filed: Jul. 30, 2012

(65) Prior Publication Data

US 2013/0036879 A1 Feb. 14, 2013

Related U.S. Application Data

(60) Provisional application No. 61/574,775, filed on Aug. 9, 2011.

(51) Int. Cl.
| | |
|---|---|
| B23B 31/00 | (2006.01) |
| B23B 25/06 | (2006.01) |
| B23B 29/20 | (2006.01) |
| B23B 31/02 | (2006.01) |

(52) U.S. Cl.
CPC ............... B23B 25/06 (2013.01); B23B 29/205 (2013.01); *Y10T 29/49826* (2015.01); *Y10T 82/2574* (2015.01); *Y10T 82/2579* (2015.01)

(58) Field of Classification Search
CPC .... B23B 31/026; B23B 31/028; B23B 31/02; B23B 31/023; B23B 31/11; B23B 31/1122
USPC ............ 82/155, 160, 159, 161, 158; 279/100, 279/101, 99, 16

See application file for complete search history.

(56) References Cited

U.S. PATENT DOCUMENTS

| | | | | | |
|---|---|---|---|---|---|
| 1,759,101 | A | * | 5/1930 | Daniels ........................... | 279/16 |
| 2,532,058 | A | * | 11/1950 | Edwin ............................ | 279/16 |
| 3,962,937 | A | * | 6/1976 | Miller ............................ | 82/1.11 |
| 4,269,421 | A | * | 5/1981 | Wawrzyniak ................... | 279/16 |
| 4,834,596 | A | * | 5/1989 | Hollifield et al. ............. | 409/232 |
| 5,372,465 | A | * | 12/1994 | Smith ............................ | 409/232 |
| 5,752,706 | A | * | 5/1998 | Hodges ............................ | 279/16 |
| 6,811,364 | B2 | * | 11/2004 | Kelzer ............................ | 411/389 |
| 8,342,539 | B2 | * | 1/2013 | Guy ............................ | 279/101 |

* cited by examiner

*Primary Examiner* — Will Fridie, Jr.
(74) *Attorney, Agent, or Firm* — Arthur Freilich

(57) ABSTRACT

A method and apparatus for orienting and rigidly clamping a cutting tool in alignment with a lathe's spindle axis in a manner to minimize the setup time required. The method and apparatus uses the lathe's spindle chuck for establishing and clamping the angular orientation and radial position of a cutting tool retainer in order to align the cutting tool with the lathe's spindle axis.

11 Claims, 11 Drawing Sheets

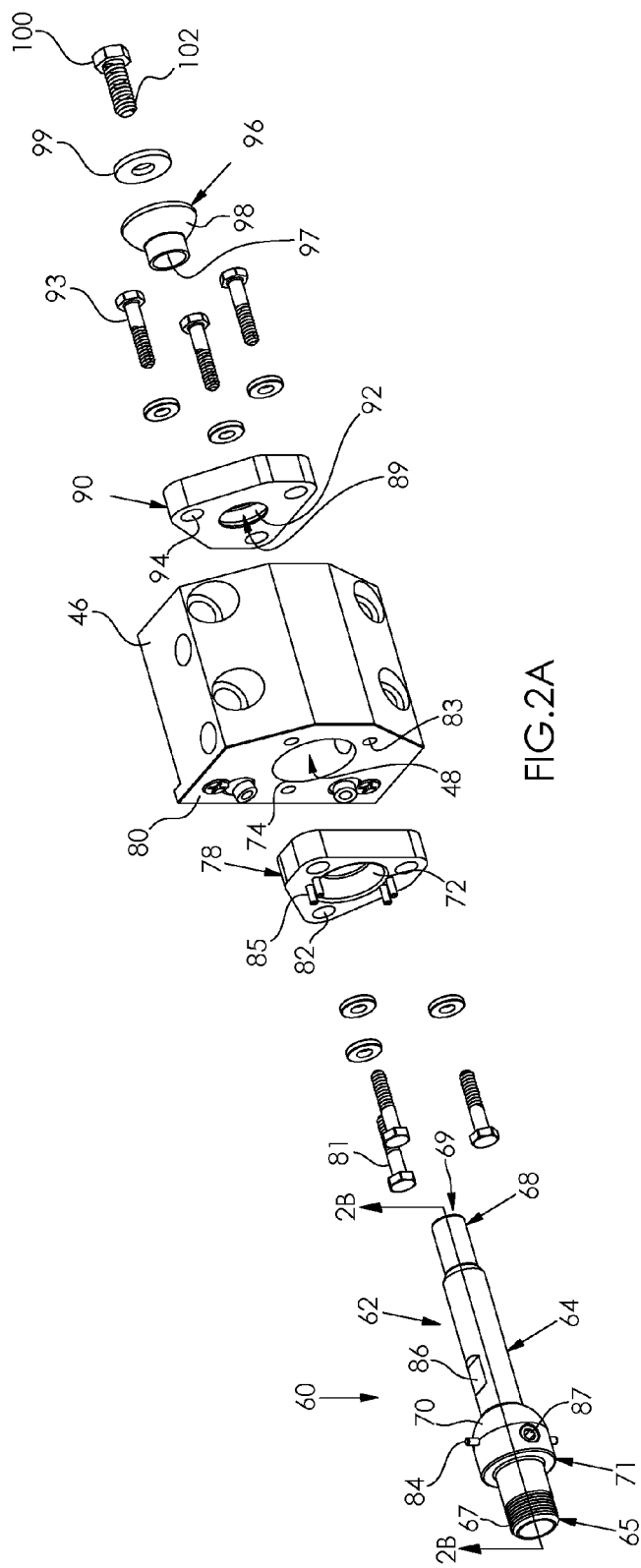
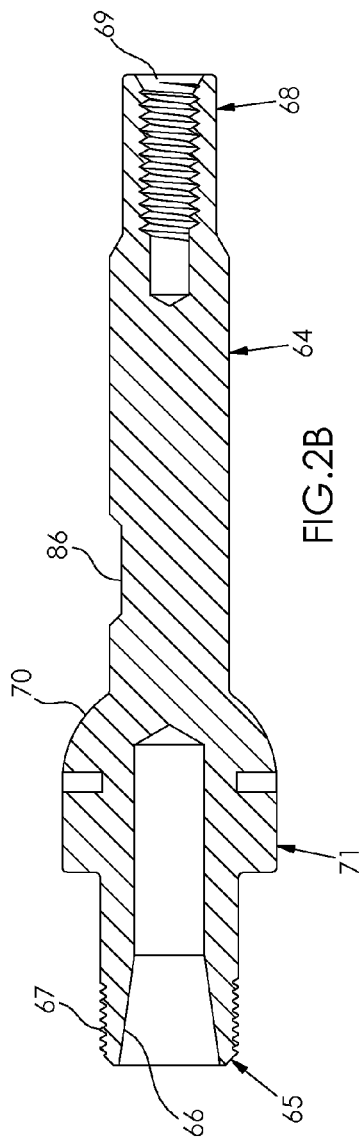
FIG.2A
FIG.2B

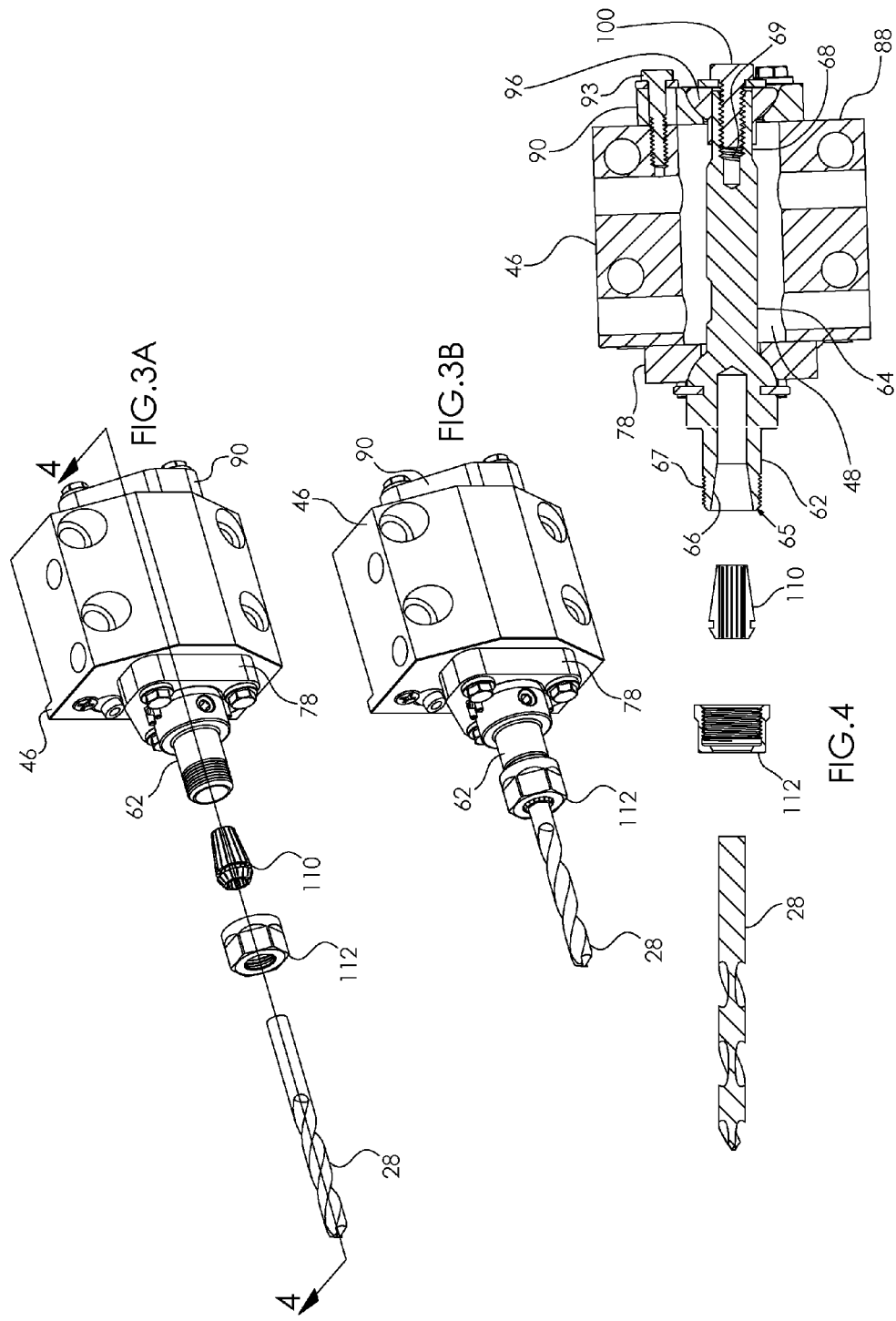

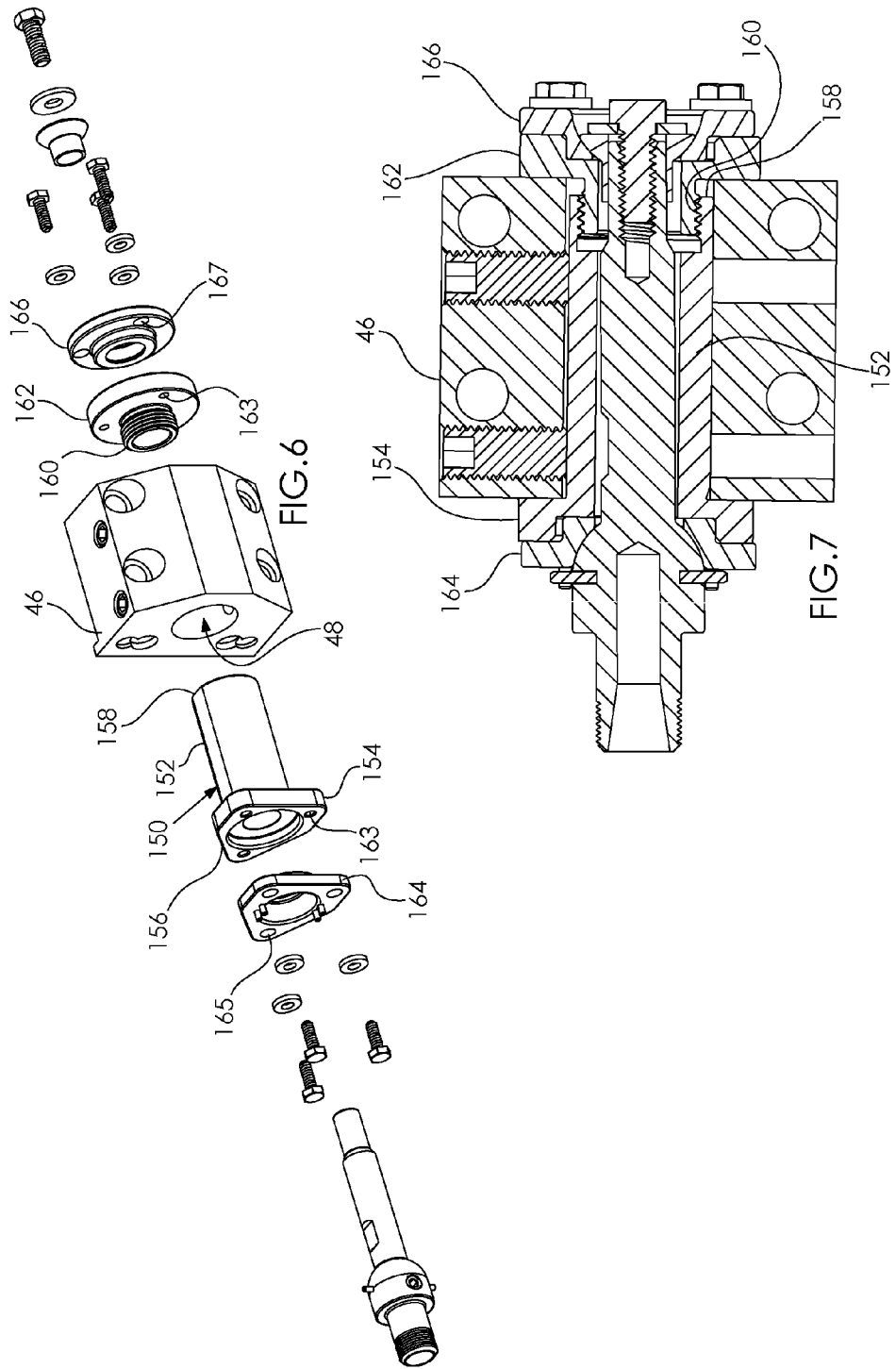

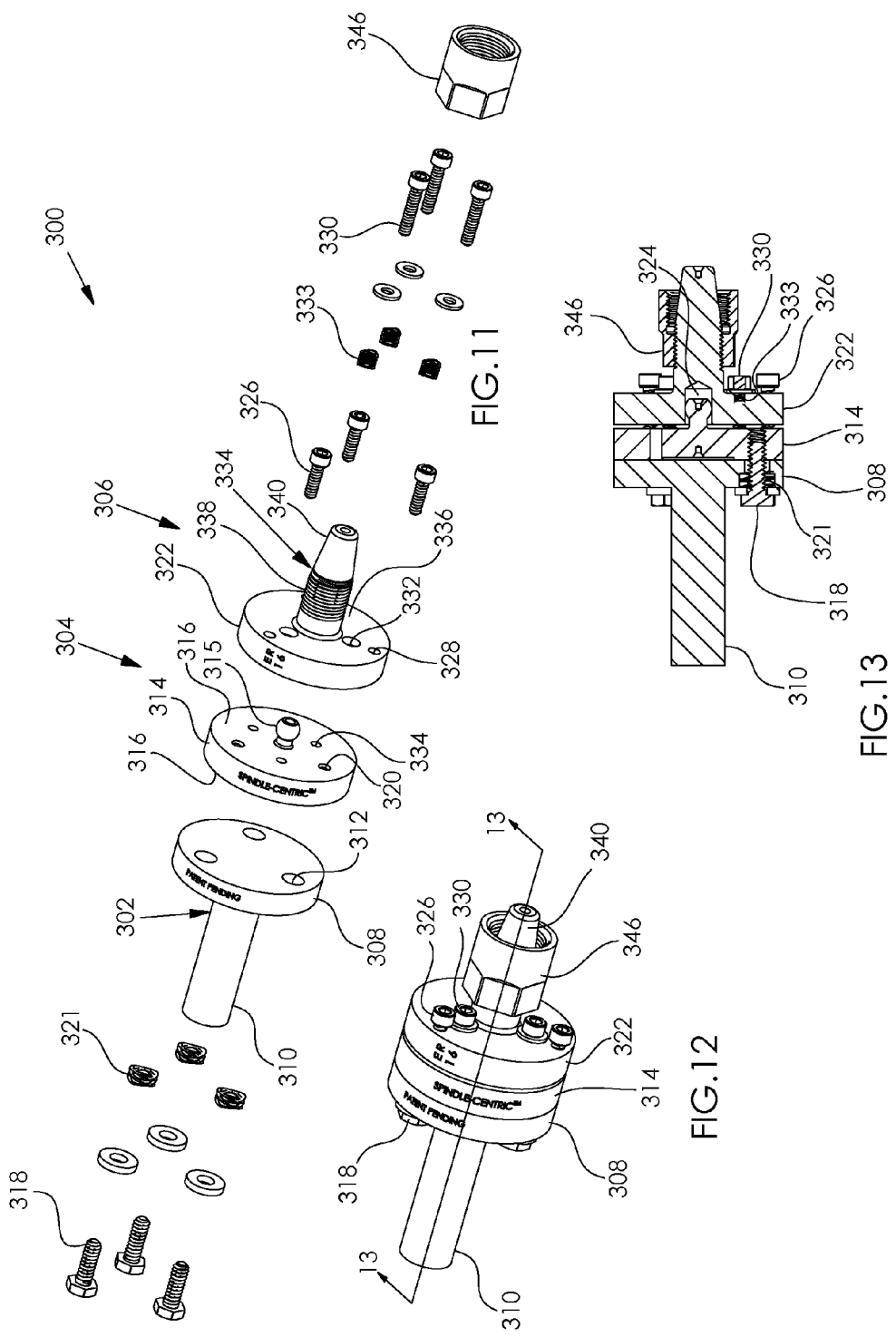

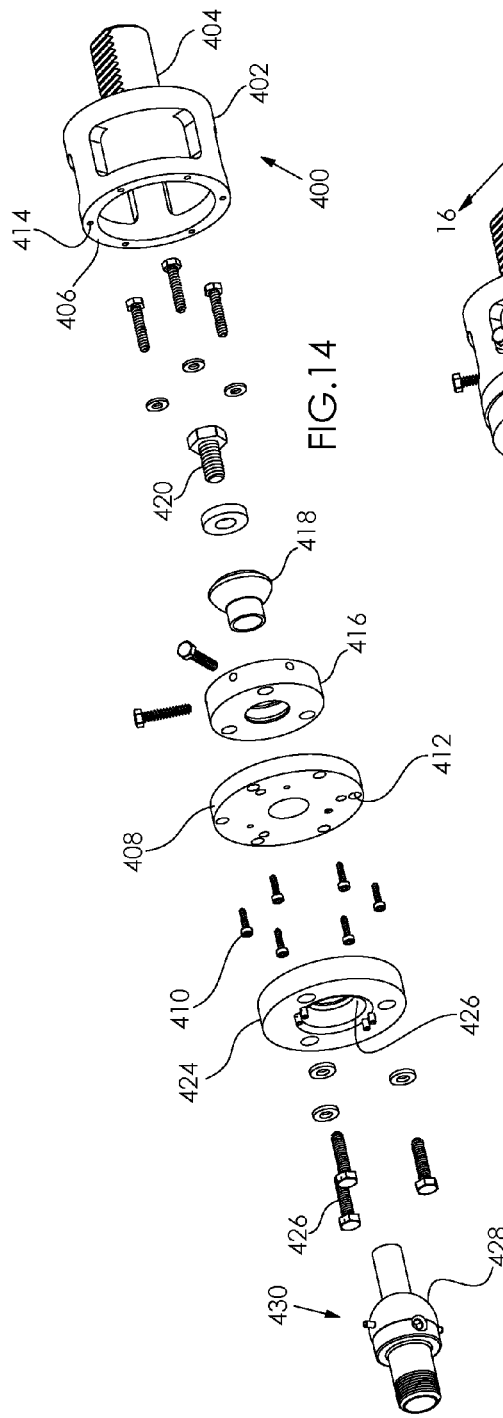
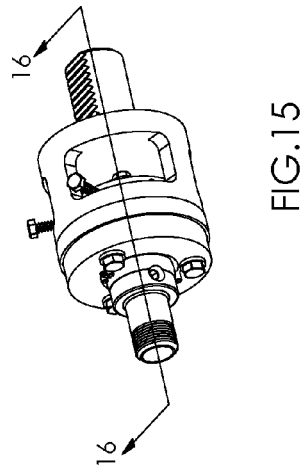
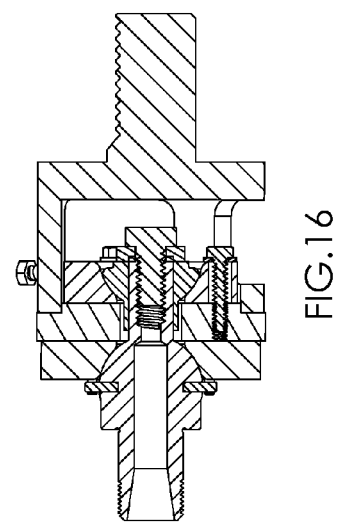
FIG. 14
FIG. 15
FIG. 16

METHOD AND APPARATUS FOR LATHE TOOL ALIGNMENT

RELATED APPLICATIONS

This application claims the benefit of U.S. Provisional Application 61/574,775 filed Aug. 9, 2011.

FIELD OF THE INVENTION

This invention relates generally to machine tools and more particularly to a method and apparatus for aligning a cutting tool, e.g., a drill bit, with the spindle axis of a rotating workpiece machine, i.e., a lathe.

BACKGROUND

Various types of lathes are well known in the art for cutting metal and other materials. They are generally characterized by a headstock including a spindle chuck for holding a workpiece and a drive mechanism for rotating the workpiece with respect to a spindle axis. A typical lathe further includes a carriage supporting a tool holding mechanism for selective axial movement parallel to the spindle axis and lateral movement perpendicular to the spindle axis. Modern CNC lathes generally also include a tool changer mechanism comprised of multiple tool holders, where each tool holder is capable of mounting a single cutting tool. The tool changer mechanism enables each tool holder and its mounted cutting tool to be selectively moved into cutting position relative to the workpiece held in the spindle chuck.

A frequently encountered cutting operation requires positioning a cutting tool, e.g., a drill bit, for drilling into the face of the workpiece in precise alignment with the lathe's spindle axis. Various techniques have been employed to achieve precision alignment, often involving significant and costly setup time and special tooling. For example only, U.S. Pat. No. 5,752,706 describes an adjustable tool holder for facilitating the angular and radial aligning of a drill bit with respect to the lathe's spindle axis. The patent teaches use of a dial indicator 18 in FIG. 1 mounted "such that it may be turned about the drill bit 16 to assess angular and radial misalignment", which may then be reduced by adjusting the tool holder orientation.

In setting up for the cutting operation, it is important to carefully position and orient the cutting tool to minimize alignment errors which could otherwise occur due to the cumulative effect of various errors and/or tolerances, e.g., between a tool holder bore and tool holder face, between the tool holder face and tool changer mounting surface, and within the tool changer positioning mechanism, etc. This careful positioning and orienting of the cutting tool typically requires a considerable amount of setup time by a person skilled in such procedures.

SUMMARY OF THE INVENTION

The present invention is directed to a method and apparatus for orienting and rigidly clamping a cutting tool in alignment with a lathe's spindle axis in a manner to minimize the setup time required. More particularly, the present invention is directed to a method and apparatus which uses the lathe's workpiece holding mechanism (hereinafter generally referred to as a "spindle chuck") for establishing the angular orientation and radial position of a cutting tool retainer in order to locate the cutting tool for cutting in alignment with the lathe's spindle axis.

A preferred cutting tool retainer in accordance with the invention comprises a collet chuck for mounting a cutting tool (which can comprise any of various devices such as drills, reamers, countersinks, etc., but which for simplicity herein will generally be referred to as a "drill bit"). In accordance with a significant aspect of the invention, the lathe's spindle chuck is used to orient the collet chuck in space in alignment with the machine's spindle axis and clamping means are provided for rigidly clamping the collet chuck in a standard tool holder while maintaining its orientation established by the spindle chuck. As will be seen hereinafter, the collet chuck orientation can be established by loading it directly into the spindle chuck or by using an intermediate device, e.g., a mandrel, to force the collet chuck into alignment with the spindle axis.

Several different types of tool changer mechanisms, as well as different types of tool holders, are well known in the art. For the sake of clarity herein, the present invention will primarily be described with respect to tool changer mechanisms of the type generally referred to as "turret" mechanisms, and tool holders having tool accommodating bores of the type generally referred to as "tool blocks". However, it should be understood that the invention is compatible with a wide variety of tool changer and tool holder implementations and it is intended that various terms used herein, including "turret" and "tool block", be broadly interpreted to include such alternative implementations.

A preferred embodiment of the present invention includes a tool retainer comprising a collet chuck defining a longitudinal axis extending between the collet chuck's front end and rear end. The collet chuck is configured so that it can be accommodated in various angular orientations relative to the tool block thus allowing it to retain its alignment with respect to the spindle axis. A preferred collet chuck embodiment has a protuberance, or positioning member located between its front and rear ends configured to cooperate with a receiving member mounted to the tool block. The positioning member preferably has a convex spherical positioning surface configured to nest in a concave spherical receiving surface of the receiving member so as to allow the collet chuck to assume various angular orientations relative to the receiving member. Moreover, the receiving member is configured for mounting on the tool block in a manner which allows for limited radial movement relative to the tool block.

By mounting the collet chuck front end in the spindle chuck, the collet chuck longitudinal axis is forced into alignment with the lathe's spindle axis. The spherical receiving surface cooperates with the collet chuck spherical positioning surface to allow the collet chuck to be clamped in the tool block in a wide range of angular orientations while retaining its angular and radial alignment with the lathe's spindle axis.

More particularly, a preferred collet chuck in accordance with the invention has a positioning surface located proximate to the collet chuck front end for mating with a receiving surface defined by a receiving member mounted proximate to the tool block front end. Clamping members located proximate to the collet chuck rear end draw the collet chuck rearwardly to seat the front positioning surface against its mating receiving surface without disturbing the orientation of the collet chuck established by the lathe's spindle chuck. The clamping members preferably also define a rear positioning surface configured to nest in a rear receiving surface defined by a receiving member mounted proximate to the tool block rear end. The clamping members include a screw for drawing the collet chuck rearwardly to concurrently seat the front positioning surface in the front receiving surface and the rear positioning surface in the rear receiving surface.

A preferred method of using a collet chuck in accordance with the invention includes the following steps:
1. Securely retaining the front end of the collet chuck in the lathe's spindle chuck;
2. Mounting a radially adjustable receiving member adjacent the front face of a tool block;
3. Axially moving the tool block toward the collet chuck to cause the collet chuck to extend through the bore of the tool block with the collet chuck front positioning surface nearly engaging the receiving member receiving surface adjacent the front face of the tool block;
4. Applying a rearward axial force to the collet chuck, without disturbing its orientation established by the lathe's spindle chuck, to seat the collet chuck spherical positioning surface against the spherical receiving surface;
5. Rigidly clamping the collet chuck rear end relative to the tool block;
6. Opening the lathe's spindle chuck and axially moving the tool block and collet chuck away from the lathe headstock; and
7. Mounting a cutting tool extending forwardly from the collet chuck front end.

DESCRIPTION OF THE FIGURES

FIG. 2A is an isometric exploded view showing components of a preferred cutting tool mounting assembly in accordance with the invention for use with a conventional tool block modified to receive the components;

FIG. 2B is an enlarged sectional view taken substantially along the plane 2B-2B of FIG. 2A;

FIGS. 3A and 3B are isometric views of the preferred assembly of FIG. 2A showing how a cutting tool is affixed to the tool retainer/collet chuck;

FIG. 4 is a sectional view taken substantially along the plane 4-4 of FIG. 3A;

FIG. 6 is an isometric exploded view (similar to FIG. 2A) showing components of a second embodiment of the invention;

FIG. 7 is a sectional view (similar to FIG. 4) showing the components of FIG. 6 as assembled;

FIG. 11 is an isometric exploded view showing components of a fourth embodiment of the invention utilizing an adjustable mandrel;

FIG. 12 is an isometric view showing the components of FIG. 11 assembled;

FIG. 13 is a sectional view taken substantially along the plane 13-13 of FIG. 12;

FIG. 14 is an isometric exploded view showing components of a fifth embodiment of the invention for use with a known VDI tool block;

FIG. 15 is an isometric view showing the components of FIG. 14 assembled; and FIG. 16 is a sectional view taken substantially along the plane 16-16 of FIG. 15.

DETAILED DESCRIPTION

Figure 1:
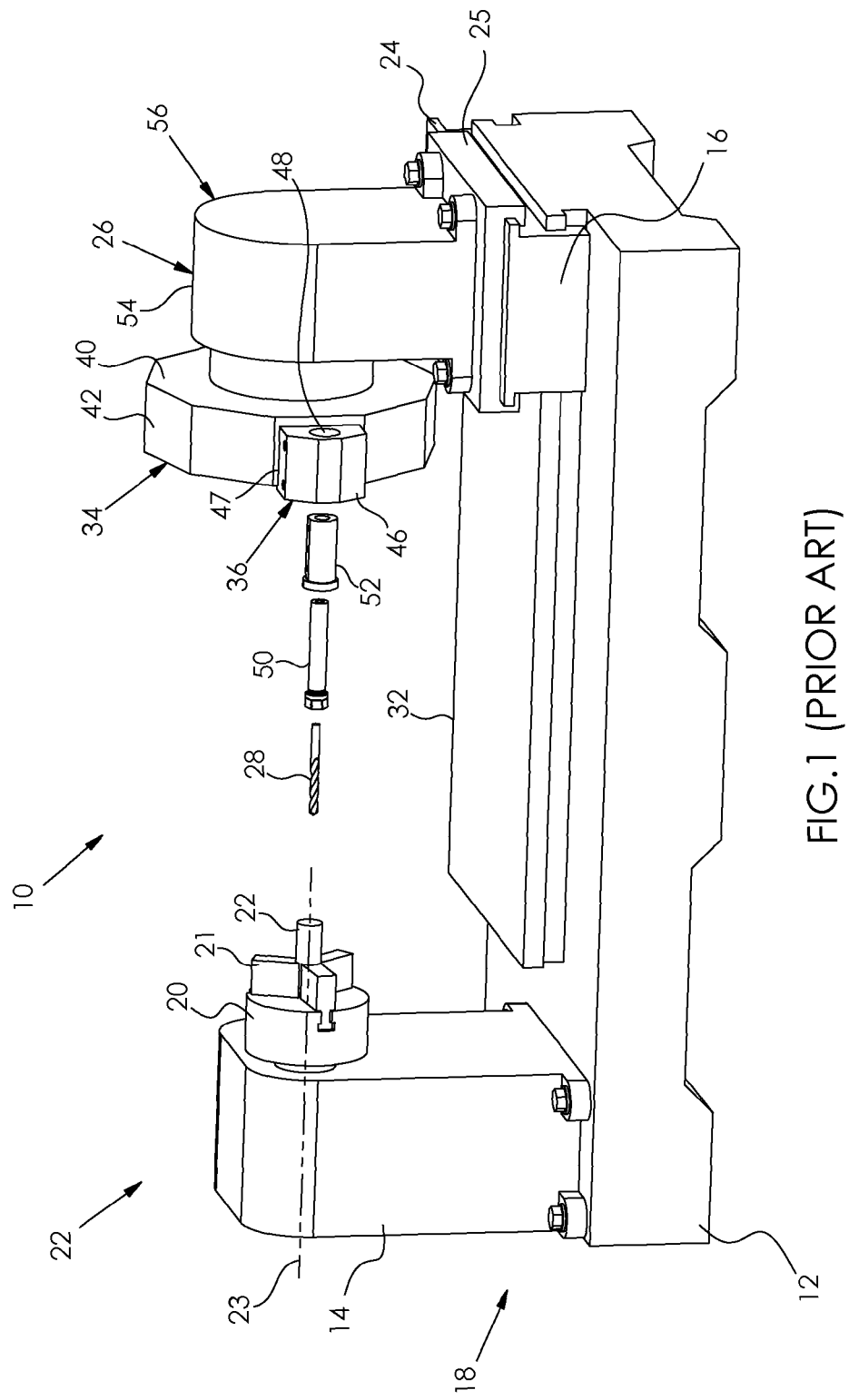
FIG. 1 is an isometric view depicting an exemplary prior art lathe.

Attention is initially directed to FIG. 1 which schematically illustrates a typical lathe 10 comprising a bed 12 supporting a headstock 14 and carriage 16. The headstock is generally comprised of a drive mechanism 18 for rotating a spindle (not shown) coupled to a spindle chuck 20. The spindle chuck 20 has adjustable jaws 21 for tightly gripping a workpiece 22 for rotation about the lathe's spindle axis 23.

The carriage 16 comprises lateral (X) ways 24 that support and guide a cross slide 25. The cross slide 25 supports a mechanism 26 for holding a cutting tool 28, e.g., a drill bit. The carriage 16 is also mounted on longitudinal (Z) ways 32 enabling axial positioning relative to the spindle chuck 20. The exemplary tool holding mechanism 26 shown in FIG. 1 comprises a tool changer mechanism 34 configured to mount multiple tool holders where each tool holder 36 is capable of mounting a single cutting tool 28.

More particularly, the tool changer mechanism 34 depicted in FIG. 1 is generally referred to as a turret assembly and is shown as comprising a plate 40 defining multiple mounting faces 42 each adapted to mount a single tool holder 36. FIG. 1 depicts an exemplary tool holder 36 comprising a standard bolt-on tool block 46 having a mounting surface 47 adapted to be bolted to a mounting face 42. The tool block 46 defines a receptacle, or bore, 48 for accommodating the cutting tool 28, collet chuck 50, and reducing bushing 52.

The tool changer mechanism 34 is typically coupled to a shaft (not shown) for rotational positioning by indexing unit 54 to move a selected one of the faces 42, and tool holder 36 mounted thereon, into cutting position.

A cutting operation frequently encountered in typical machine shops calls for drilling into the workpiece 22 in precise alignment with the spindle axis 23 around which the workpiece is rotated. Considerable time must often be spent in setting up this operation to minimize alignment errors which can be attributed to the cumulative effect of various errors and/or tolerances, e.g., between the tool block bore 48 and tool block mounting surface 47, between the tool block mounting surface 47 and turret mounting face 42, and within the indexing unit 54.

The present invention is directed to a method and apparatus for referencing the radial position and angular orientation of the cutting tool 28 directly to the spindle axis 23 defined by spindle chuck 20 in order to avoid the adverse consequences of the aforementioned errors and/or tolerances.

Attention is now directed to FIGS. 2A, 2B, 3A, 3B, and 4 which illustrate a preferred apparatus in accordance with a first embodiment of the invention configured for use in conjunction with the exemplary tool block 46 of FIG. 1. The apparatus includes a tool retainer 60 comprising a specially configured collet chuck 62. The collet chuck 62 comprises an elongate body 64 having a front end 65 defining a tapered internal pocket 66 and having external threads 67. The collet chuck rear end 68 has an internally threaded axial recess 69. The body 64 carries a convex spherical positioning surface 70 on a protuberance, or positioning member, 71 located between said body front end 65 and rear end 68.

The collet chuck body 64 is dimensioned to extend through the tool block bore 48 with the spherical positioning surface 70 adapted to engage a concave spherical receiving surface 72 located proximate to the entrance 74 of the bore 48. When using a standard tool block 46, the concave spherical receiving surface 72 is preferably formed by a receiving socket, or member 78 which is configured for attachment to the front face 80 of block 46 by bolts 81. The bolts 81 pass through openings 82 in socket member 78 and are threaded into holes 83 extending into block 46. Note that openings 82 are oversized to allow for limited radial/lateral movement of the socket member 78 relative to the tool block prior to tightening the bolts 81. The concave spherical surface 72 is configured to receive and engage the collet chuck convex positioning surface 70 to allow the collet chuck to be clamped at various angular orientations relative to the bore 48. The collet chuck body 64 preferably carries at least one radially extending pin 84 adapted to be received between spaced pins 85 secured to socket member 78. The respective pins interact to limit the range of rotational movement of the body 64 relative to the socket member 78 without significantly restricting the range of angular orientations the body 64 can assume relative to socket member 78. The collet chuck 62 is preferably also provided with a flat area 86 engageable by a set screw (not shown) which can be used to prevent rotation of the collet chuck in a tool holder 36. Additionally, a coolant port 87 can be provided, e.g., extending radially into protuberance/positioning member 71.

The elongate chuck body 64 is preferably dimensioned so that when surfaces 70 and 72 are close to engagement, the body rear end 68 projects beyond the tool block 46 rear face 88 (FIG. 4) to facilitate clamping. More particularly, the chuck body rear end 68 is configured to project through a central opening 89 of a receiving socket member 90 defining a rearwardly opening concave spherical receiving surface 92 (FIG. 5D). The socket member 90 is adapted to be secured to the tool block rear face 88 by bolts 93 which extend through oversized openings 94 in socket 90 and are then threaded into holes 95 entering the rear face of the tool block 46. The oversized openings 94 permit limited radial/lateral movement of the socket 90 relative to the tool block 46.

Additional rear end clamping members include a clamp 96 defining a central opening 97 and convex spherical positioning surface 98 adapted to engage the concave spherical surface 92, a washer 99, and a draw screw 100. The screw 100 has external threads 102 for engaging the internal threads in axial recess 69 at the rear end of the body 64.

Until the draw screw 100 is threaded tightly into body 64, the radial/lateral positions of receiving members 78 and 90 can be adjusted to allow their receiving surfaces to mate with their respective positioning surfaces to accommodate the radial and angular orientation of the collet chuck 62 established by the spindle chuck 20. After adjustment of the receiving surfaces, the orientation of the body 64 can be fixed in space by threading screw 100 into the rear end of body 64. The screw 100 acts to draw the body rearwardly along its longitudinal axis to seat and tightly clamp the concave spherical surfaces 72 and 92 against their respective convex spherical surfaces 70 and 98. By clamping the collet chuck body 64 in this manner, it can be retained in alignment with the spindle axis regardless of whether or not it is aligned with the block bore 48. Note, for example, FIG. 4 depicts the body 64 as being slightly misaligned in the bore 48.

Attention is now directed to FIGS. 5A, 5B, 5C, 5D, 5E, 5F, 5G which depict sequential steps of a preferred procedure for establishing the radial position and angular orientation of a cutting tool 28 in accordance with the invention using the assembly of FIGS. 2A, 3A, 3B, 4.

Figure 5A:
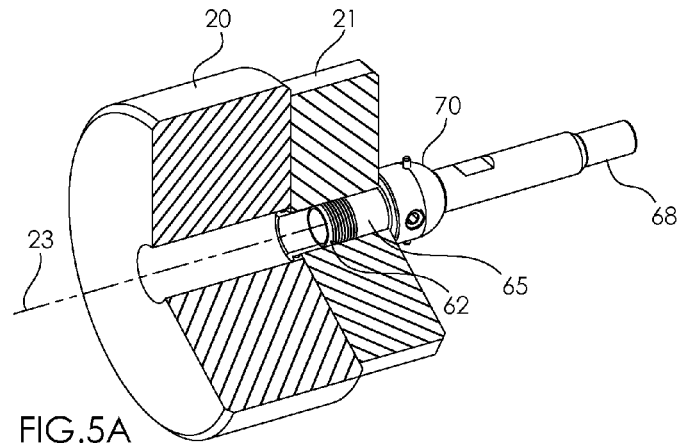
FIGS. 5A, 5B, 5C, 5D, 5E, 5F, 5G are isometric views showing a sequence of steps used with a preferred embodiment of the invention for aligning a cutting tool with a lathe's spindle axis.

FIG. 5A shows the collet chuck externally threaded front end 65 clamped in the jaws of spindle chuck 20 to align the collet chuck axis with the lathe's spindle axis 23.

Figure 5B:
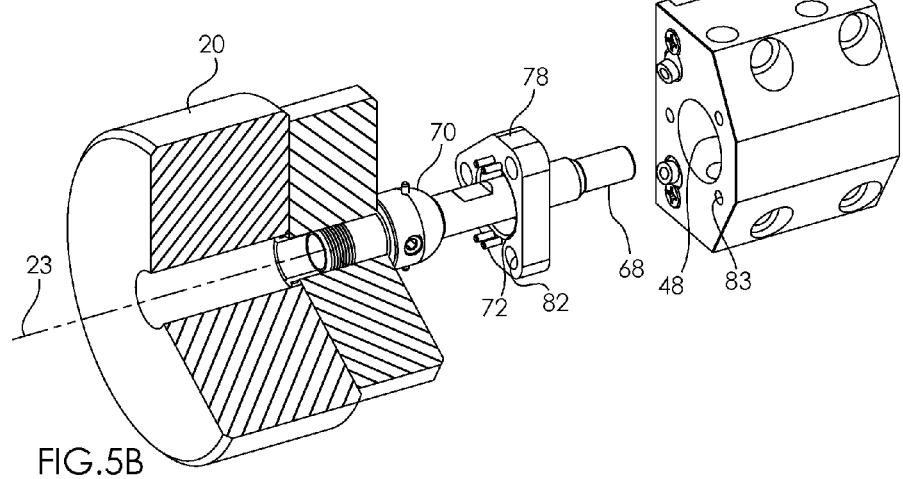

FIG. 5B shows the tool block 46 having been moved by carriage 16 to position bore 48 in substantial alignment with the spindle axis 23.

Figure 5C:
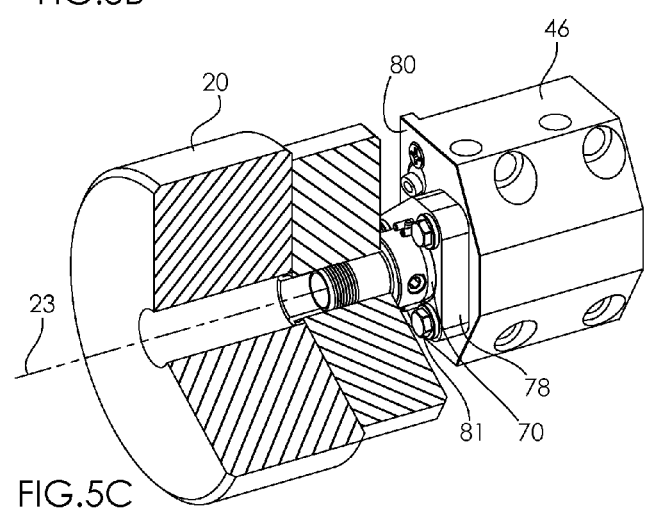
Figure 5D:
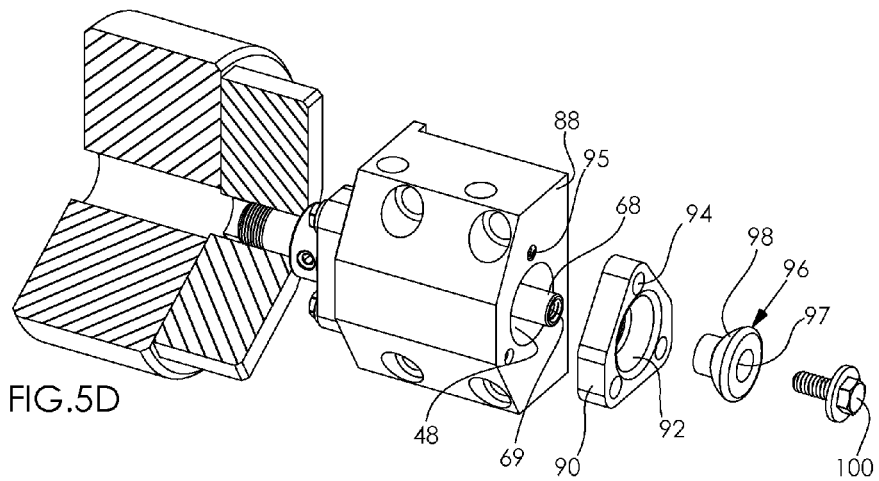

FIG. 5C shows the tool block bore 48 having been moved over the collet chuck rear end 68 to almost "pinch" the socket member 78 between the collet chuck positioning surface 70 and the tool block front face 80 and to position the socket member so that its openings 82 sufficiently overlap holes 83 to accommodate bolts 81. Bolts 81 are then threaded through openings 82 into holes 83 to loosely fix the socket member 78 relative to the tool block.

FIG. 5D shows socket member 90 about to be mounted over collet chuck rear end 68 with the concave receiving surface 92 opening rearwardly. The clamp member 96 is mounted onto the collet chuck rear end 68 to engage its convex spherical surface 98 against socket concave receiving surface 92.

Figure 5E:
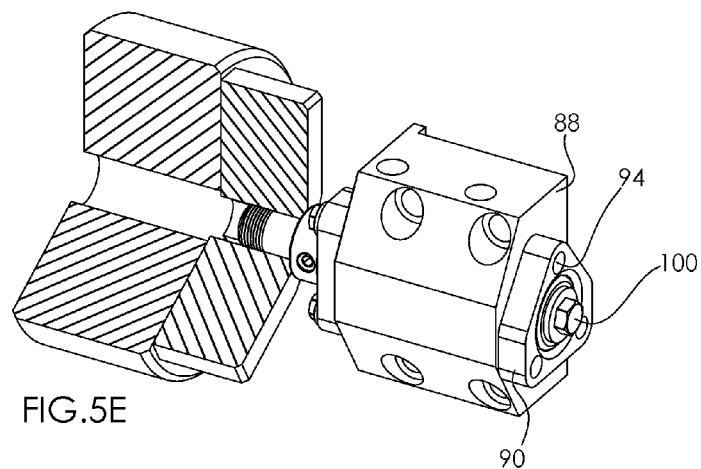

FIG. 5E shows draw screw 100 threaded into the rear end of body 64 to compel engagement of the positioning surface 70 against receiving surface 72 and positioning surface 98 against receiving surface 92. This threading action radially positions receiving sockets 78 and 90 against the tool block front end and rear faces and allows bolts 81 and 93 to be tightened into respective tool block holes 83 and 95.

Figure 5F:
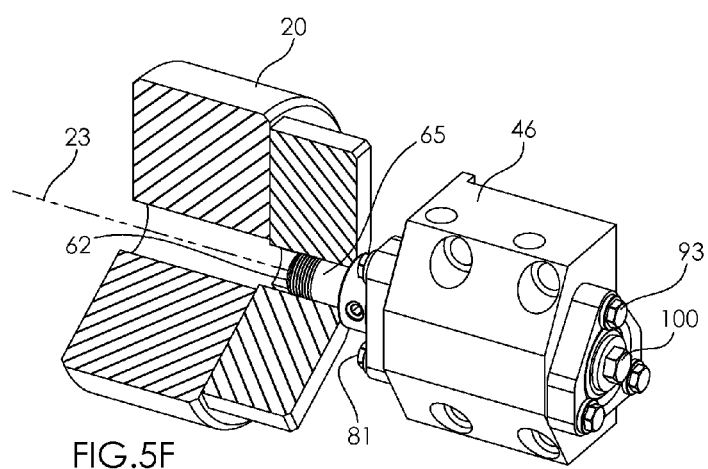

FIG. 5F shows that the front bolts 81 and rear bolts 93 have been tightened to thus preserve the radial positioning and angular orientation of the respective concave spherical surfaces 72 and 92 aligned with the convex surfaces 70 and 98.

Figure 5G:
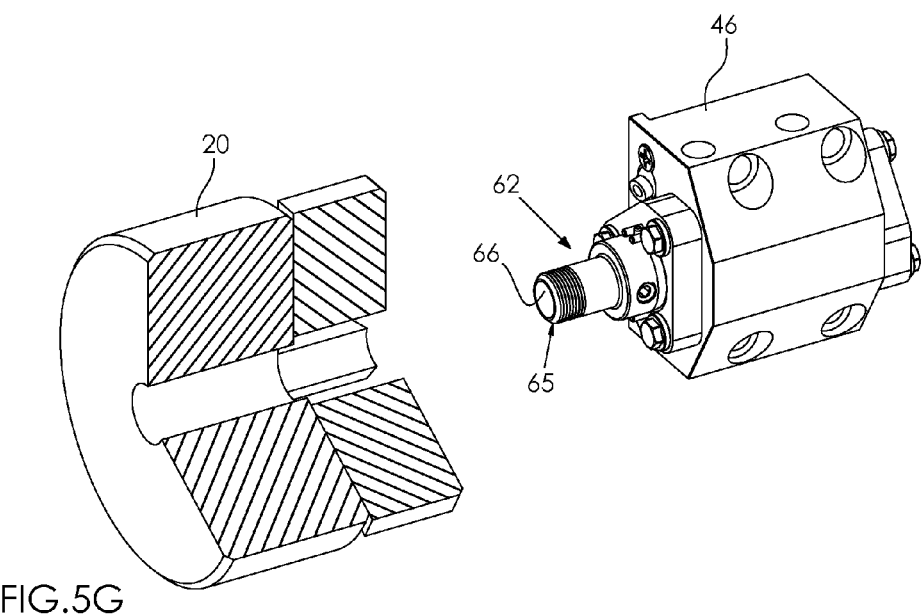

FIG. 5G shows release of the collet chuck from the spindle chuck 20 with the tool block having moved away from the spindle chuck 20. The collet chuck front end internal pocket 66 can then receive collet member 110 and compression nut 112 (FIG. 4) can be threaded onto external threads 67 in a conventional manner for retaining cutting tool 28.

From the foregoing, it should now be understood that a preferred method and apparatus have been described which directly utilize a lathe's spindle chuck to orient a tool retainer for aligning a cutting tool with the lathe's spindle axis. It is recognized that several variations and modifications can be made to better satisfy particular situations. For example, certain users may prefer to avoid having to machine holes 83 and 95 into their existing tool block 46. To satisfy this situation, a second embodiment of the invention is illustrated in FIGS. 6 and 7.

FIG. 6 is similar to FIG. 2A but avoids bolting socket members 78 and 90 directly the tool block 46. Instead, a receiver member 150 is provided comprised of a tubular portion 152 dimensioned to fit closely into tool block bore 48 and a front flange member 154 attached to the front end 156 of tubular portion 152. The rear end 158 of the tubular portion is internally threaded for receiving the externally threaded nipple 160 of rear flange member 162. By threading nipple 160 into the rear end of tubular portion 152, the respective flange members 154 and 162 will be brought into tight contact against the front and rear faces of the tool block 46. The flange members 154 and 162 contain holes 163 corresponding to the holes 83 and 95 in the tool block front and rear faces of the embodiment of FIG. 2A. A front socket member 164 having oversized holes 165 is bolted to front flange member 154. A rear socket member 166 providing a rearwardly facing concave spherical receiving surface is bolted to rear flange member 162 using oversized holes 167.

Figure 8:
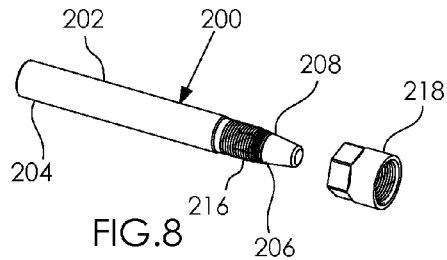
FIG. 8 is an isometric view of a mandrel useful in accordance with a third embodiment of the invention for orienting a collet chuck in alignment with the spindle axis.
Figure 9A:
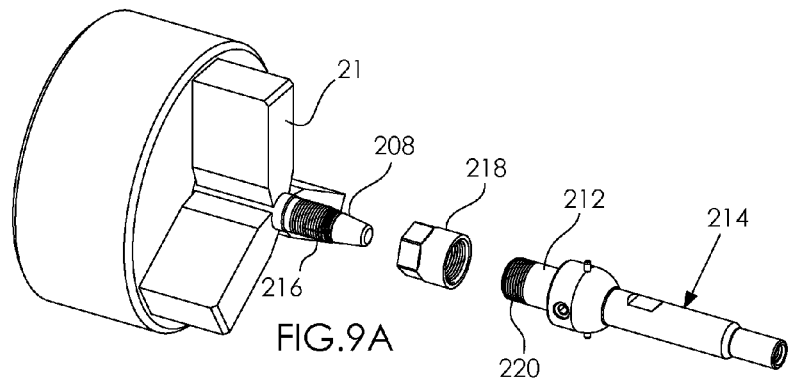
FIG. 9A-9C are sequential isometric views showing how the mandrel is used to establish the collet chuck orientation.
Figure 9B:
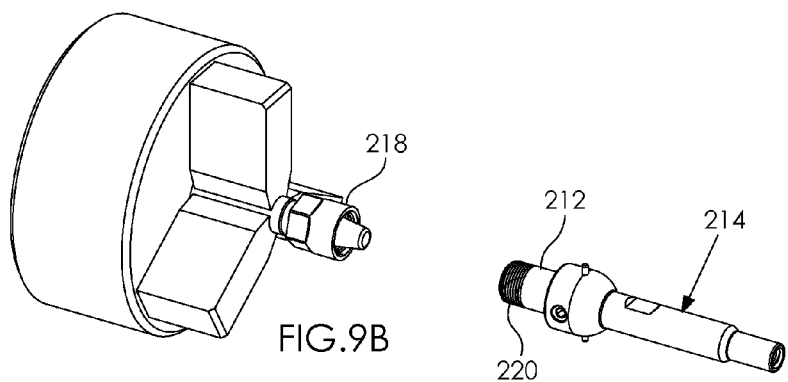
Figure 9C:
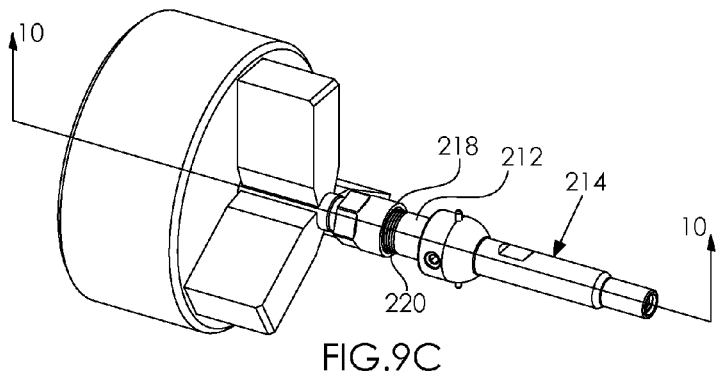

Attention is now directed to FIGS. 8, 9A, 9B, 9C, and 10 which depict a third embodiment of the invention characterized by the use of a mandrel for aligning the collet chuck with the lathe's spindle axis. More particularly, some users may prefer to avoid directly clamping the spindle chuck jaws 21 against the external threads 67 of the collet chuck front end as is represented in FIGS. 5A-5F. Accordingly, in the embodiment of FIG. 8, an elongate mandrel 200 is provided comprising a body 202 having a front end 204 and a rear end 206. The front end 204 is preferably cylindrically shaped and adapted to be readily grasped by the spindle chuck jaws 21 (FIG. 9A). The rear end 206 is tapered at 208 in a manner to nest closely in a tapered internal pocket 210 at the front end 212 of collet chuck 214. An external thread 216, preferably left handed, is provided on the mandrel body 202 adapted to be threaded into nut 218. The external thread 220 on collet chuck front end 212 is also adapted to be threaded into nut 218 so as to rigidly secure the mandrel body 202 and collet chuck 214 together. The tapered male end 208 of the mandrel 200 nests into tapered internal pocket 210 of the collet chuck 214 to force the collet chuck into precise alignment with the mandrel 200 and thus with the spindle axis. The collet chuck 214 is then clamped into the tool block in the manner previously described with respect to FIGS. 5A-5F.

Figure 10:
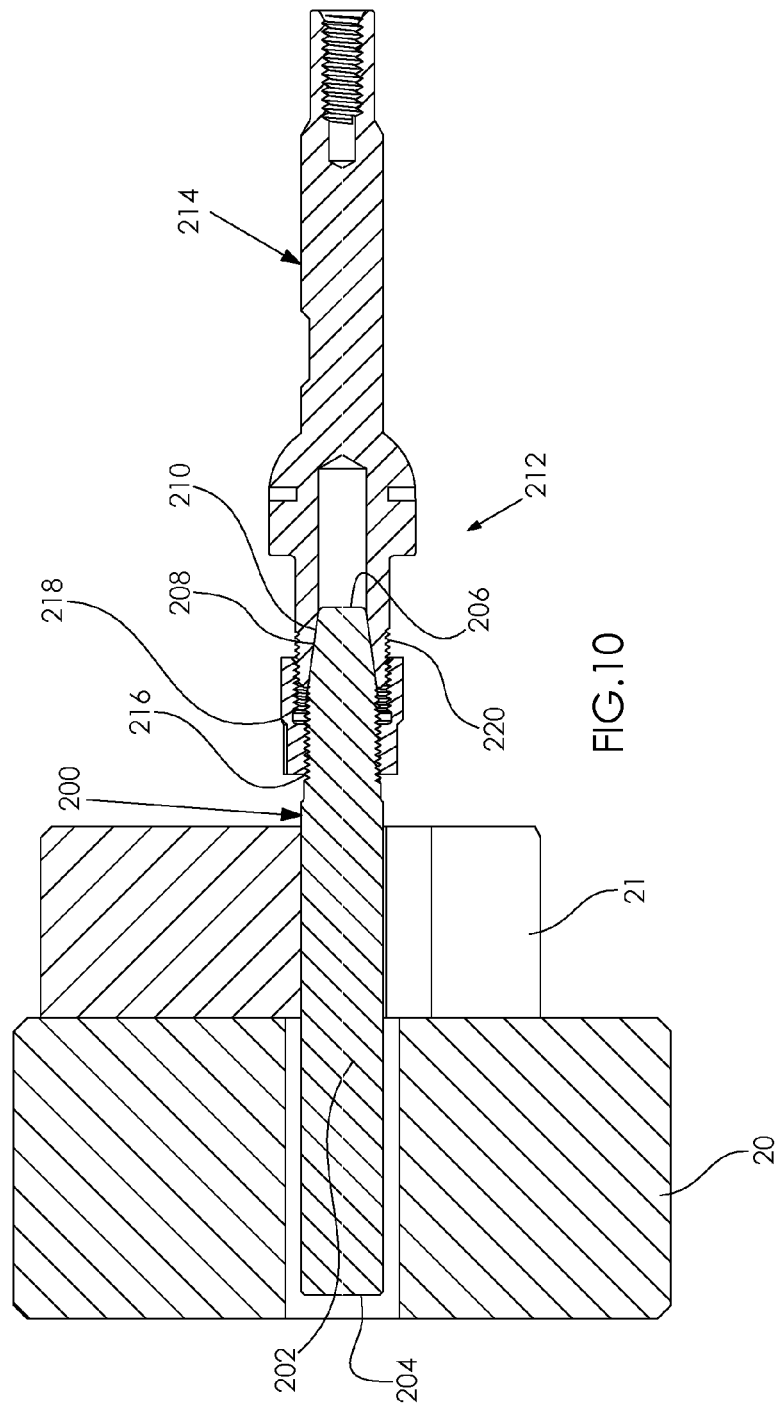
FIG. 10 is a sectional view taken substantially along plane 10-10 of FIG. 9C.

The mandrel 200 in the embodiment of FIGS. 8-10 is rigid and functions to force the collet chuck 214 into precise alignment with the axis defined by the jaws 21 of the lathe's spindle chuck which, thus far, has been assumed to be coincident with the lathe's axis of rotation, i.e., spindle axis. It is recognized, however, that in some situations, the axis defined by the lathe's spindle jaws may not precisely align with the spindle axis. This discrepancy can be mitigated, if necessary, by machining the solid mandrel and/or the spindle chuck jaws to better align the axis defined by the mandrel and/or jaws with the spindle axis. Alternatively, an adjustable mandrel assembly 300 (as shown in the embodiment of FIGS. 11-13) can be used.

The adjustable mandrel assembly 300 is comprised of a front base member 302, an intermediate radial adjustment member 304, and a rear angular adjustment member 306. The base member 302 comprises a plate member 308 having an axial shank 310 extending therefrom. The shank 310 is configured and dimensioned for insertion into the afore discussed spindle chuck 20. Oversized openings 312 extend through the plate 308.

The intermediate radial adjustment member 304 comprises a plate 314 having a centrally disposed spherical member 315 projecting rearwardly from the rear face 316. Screws 318 are provided for extending through oversized openings 312 for threading into holes 320 extending through plate 314. The oversized openings permit the plate 314 to be adjusted radially relative to shank 310 assumed to be coincident with the spindle axis. Springs 321 are preferably used around screws 318 to maintain tension and aid in adjustment.

The angular adjustment member 306 comprises a plate 322 having a recess 324 for receiving spherical member 315. Three jack screws 326 are provided to extend through holes 328 for bearing against rear face 316 for adjusting the angular orientation of plate 322 relative to plate 314. Screws 330 are used to project through openings 332 for threading into threaded holes 334 extending into the rear face 316 of plate 314 to fix plate 322 to plate 314. The screws 330 preferably pass through springs 333 to aid adjustment.

A mandrel 334 projects axially from the rear face 336 of plate 322. As with mandrel 200 in the embodiment of FIG. 10, mandrel 334 has external threads 338, which are preferably left handed, and tapered rear end 340 adapted to nest in pocket 210 of a collet chuck 214. Nut 346 is provided for axially securing and removing mandrel 334 to and from collet chuck 214.

In the use of the mandrel assembly 300 to mitigate discrepancies between the axis of the spindle jaws and the spindle axis, limited radial adjustment of the plate 314 can be made as a consequence of the screws 318 extending through oversized openings 312. Also, limited adjustment of the angular orientation of plate 322 can be made by differential use of three jack screws 326. By appropriate adjustment of the radial positioning and angular orientation, the mandrel 334 can be precisely aligned with the spindle axis.

The embodiments of FIGS. 2A and 6 show the invention configured for use with an exemplary tool holder 36 comprising a standard bolt-on tool block 46. It should, however, be understood that embodiments of the invention are equally compatible with the many other types of tool holders well known in the art (e.g., see http://www.exsys-tool.com/catalogs.html) such as VDI tool holders.

FIG. 14 is similar to FIG. 2A but assumes use of a tool holder 400 comprising a chassis member 402 having a rearwardly projecting VDI shank 404. The chassis member 402 includes a front surface 406 for mounting a base plate 408 using screws 410 extending through openings 412 and threaded into holes 414. FIG. 14 shows a rear socket member 416, a clamp 418, and a draw screw 420, which correspond respectively to similarly named parts 90, 96, and 100 in FIG. 2A. FIG. 14 also shows a front socket member 424 which is analogous to socket member 78 of FIG. 2A, adapted for mounting onto base plate 408 using screws 426. The front socket member 424 provides a concave spherical receiving surface 426 for accommodating convex spherical positioning surface 428 on collet chuck 430.

From the foregoing, it should now be appreciated that multiple hardware embodiments have been described characterized by the use of a lathe's spindle chuck to orient a tool retainer in alignment with a lathe's spindle axis together with clamping means for rigidly fixing the retainer in a standard tool holder while retaining its angular orientation and radial positioning relative to the spindle chuck.

The invention claimed is:

1. For use in combination with a lathe having (1) a spindle chuck adapted to hold a workpiece for rotation with respect to a spindle axis and (2) a tool holder configured for axial movement substantially parallel to said spindle axis, apparatus for aligning a cutting tool with said spindle axis, said apparatus comprising:
a tool retainer comprising a body extending axially between a front end and a rear end and wherein said front end is configured for coupling to said spindle chuck for aligning said retainer body with said spindle axis; and
means clamping said retainer body to said tool holder while maintaining the axis of said body in alignment with said spindle axis, said clamping means including:
a first positioning surface located on said retainer body between said front end and said rear end;
a first receiving surface mounted to said tool holder for limited radial adjustment relative to said spindle axis; and wherein
said first positioning surface and said first receiving surface are configured to nest with one another to allow clamping said retainer body in a range of different angular orientations.

2. The apparatus of claim 1 wherein said first positioning surface comprises a convex spherical surface and said first receiving surface comprises a concave spherical surface.

3. The apparatus of claim 2 further including means for drawing said retainer body axially to clamp said first positioning surface against said first receiving surface.

4. The apparatus of claim 1 wherein said retainer body front end is configured to retain a cutting tool.

5. For use in combination with a lathe having (1) a spindle chuck adapted to hold a workplace for rotation with respect to a spindle axis and (2) a tool holder configured for axial movement substantially parallel to said spindle axis, apparatus for aligning a cutting tool with said spindle axis, said apparatus comprising:

a tool retainer comprising a body extending axially between a front end and a rear end and wherein said front end is configured for coupling to said spindle chuck for aligning said retainer body with said spindle axis; and means clamping said retainer body to said tool holder while maintaining the axis of said body in alignment with said spindle axis, said clamping means including:

a first positioning surface located on said retainer body between said front end and said rear end;

a first receiving surface mounted to said tool holder; and wherein said first positioning surface and said first receiving surface are configured to nest with one another to allow clamping said retainer body in a range of different angular orientations;

a second positioning surface carried by said retainer body spaced axially rearwardly from said first positioning surface;

a second receiving surface mounted to said tool holder; and wherein said second positioning surface and said second receiving surface are configured to nest with one another for a range of different angular orientations.

6. The apparatus of claim 5 further including means for drawing said retainer body rearwardly to concurrently clamp said first positioning surface against said first receiving surface and said second positioning surface against said second receiving surface.

7. The apparatus of claim 6 wherein said first and second receiving surfaces are mounted to said tool holder for limited radial adjustment relative to said spindle axis.

8. A method of aligning a cutting tool with the axis of a lathe having a spindle chuck, said method comprising:

providing an elongate tool retainer body having axially spaced front and rear ends wherein said retainer body includes an internally tapered pocket extending axially into said body front end;

coupling said retainer body front end to said spindle chuck to orient said retainer body in alignment with said axis;

providing a first positioning surface on said retainer body;

providing a first receiving surface on a tool holder of said lathe configured to nest with said first positioning surface; and drawing said retainer body axially to clamp said first positioning surface against said first receiving surface for retaining said retainer body at an angular orientation in alignment with said axis.

9. The method of claim 8 including the further step of adjusting the radial position of said first receiving surface.

10. The method of claim 8 wherein said coupling step includes inserting said body front end directly into said spindle chuck.

11. The method of claim 8 wherein said coupling step includes providing an elongate mandrel having a front end configured for direct insertion into said spindle chuck and a tapered rear end configured for insertion into said tapered pocket.

* * * * *